July 2, 1968 S. S. C. CHAO 3,391,400

MAGNETIC RECORDER AND REPRODUCE SYSTEM UTILIZING A CLOCK SIGNAL

Filed July 2, 1964

SIDNEY S. C. CHAO
INVENTOR.

BY Stuart Lubitz
ATTORNEY

United States Patent Office
3,391,400
Patented July 2, 1968

3,391,400
MAGNETIC RECORDER AND REPRODUCE SYSTEM UTILIZING A CLOCK SIGNAL

Sidney S. C. Chao, Palo Alto, Calif., assignor to Ampex Corporation, Redwood City, Calif., a corporation of California Filed July 2, 1964, Ser. No. 379,893
6 Claims. (Cl. 340—174.1)

ABSTRACT OF THE DISCLOSURE

Self-clocking apparatus for use in digital recording/reproduce systems wherein selected peaks of a zero erase code which represents the data to be stored are sensed and selectively employed to trigger means which resonates at a predetermined frequency for a sustained period thereby defining a continuously available clock signal when triggering pulses are not available.

This invention relates to a recorder system wherein a clock signal is extracted from the data signal.

In the decoding of digital signal information many codes or formats require that a clock signal be transmitted with the data signal to the subsequent processing equipment. The most common methods for accomplishing this in a recorder have been: (1) placing a marker signal periodically in a separate part of the data signal; (2) organizing the data into blocks with each block indicating a time interval; and (3) providing a separate channel for clock signals. These prior art techniques have the disadvantages of imposing format restraints on the recorded data, requiring extra channels or bit spaces and thereby lowering the packing density attainable, being subject to dropout disturbances, and being incompatible with packing densities over 5,000 bits per inch.

Briefly, this invention overcomes the above shortcomings by providing record electronic means for recording a zero erase code, reproduce electronic means for reading out said recorded zero erase code and a means for extracting a clock signal from the recorded zero erase code. The basis for the extracted clock signal is that the detected zero erase code contains a component which is the second harmonic or twice the frequency of the desired clock signal. The zero erase code and the details of a system for recording this code are described in U.S. Patent 3,277,454 filed Dec. 23, 1963, by Sidney S. C. Chao and entitled, "Recorder and Method of Recordings." The zero erase code is well suited and reliable at packing densities over 5,000 bits per inch and consequently the extracted clock is also reliable. The extraction of the clock signal from the information recorded eliminates any waste of channels or bits and therefore the clock signal does not limit the packing density obtainable. Further, the coupling of the extracted clock signal to a tuned amplifier enables the clock signal to be sustained notwithstanding a dropout or other tape imperfection.

These objects and advantages will be better understood when the detailed description which follows is taken in conjunction with the drawings wherein.

Figure 1:
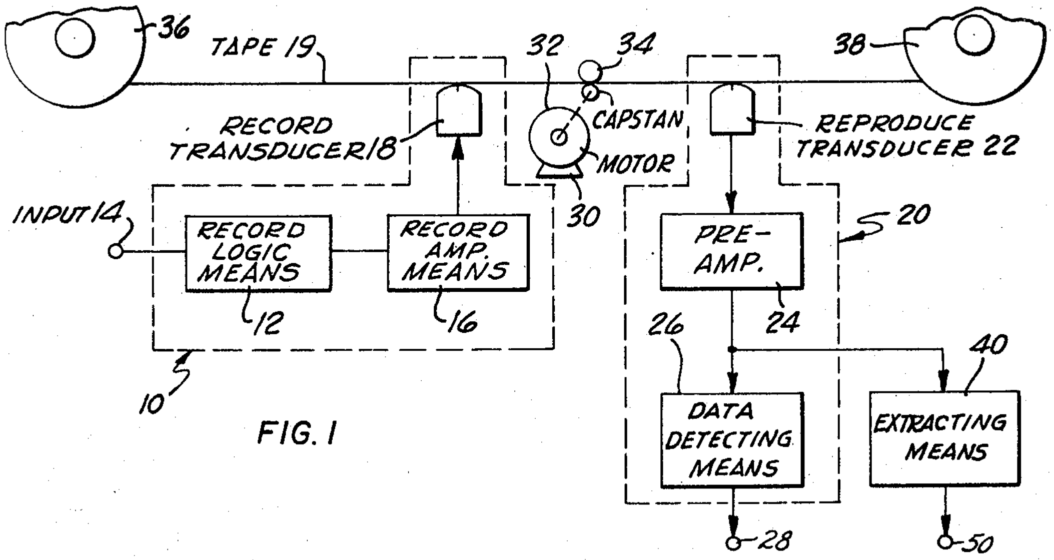
FIGURE 1 is a block diagram of a record and reproduce system embodying the invention.
Figure 2:
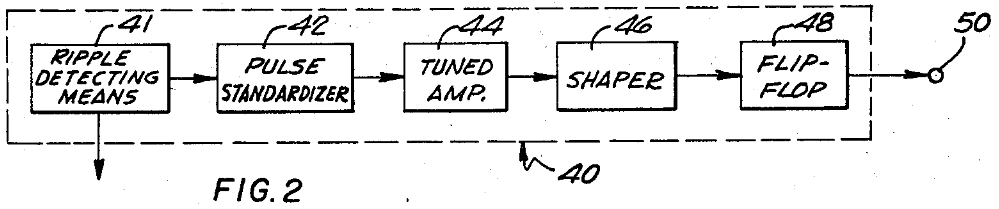
FIGURE 2 is a detailed block diagram showing a portion of the reproduce electronics that enables a clock signal to be generated.

Referring to FIGURE 1 the recorder system is schematically shown as including a record electronic means 10, a reproduce electronic means 20, tape transport means 30 and a means for extracting a clock signal 40. The record electronic means 10 includes record logic means 12 for decoding the input data supplied to input terminal 14 and for generating a zero erase code representative of the input data. A typical arrangement for accomplishing these functions is disclosed in the aforementioned U.S. Patent 3,277,454. The output from the record logic means 12 is connected to record amplifier means 16 which may be selected from the numerous well known record amplifier devices. The output from the record amplifier means 16 is connected to a record transducer which may take the form of most any of the well known magnetic head transducers utilized in magnetic recording, such as is disclosed in U.S. Patent 2,711,945 issued to O. Kornei on June 28, 1955. The record transducer 18 is energized by record amplifier means 16 and in turn applies a magnetic field to the recording media or tape 19, as is well known.

Figures 3A, 3B, 3C, 3D, 3E, 3F:
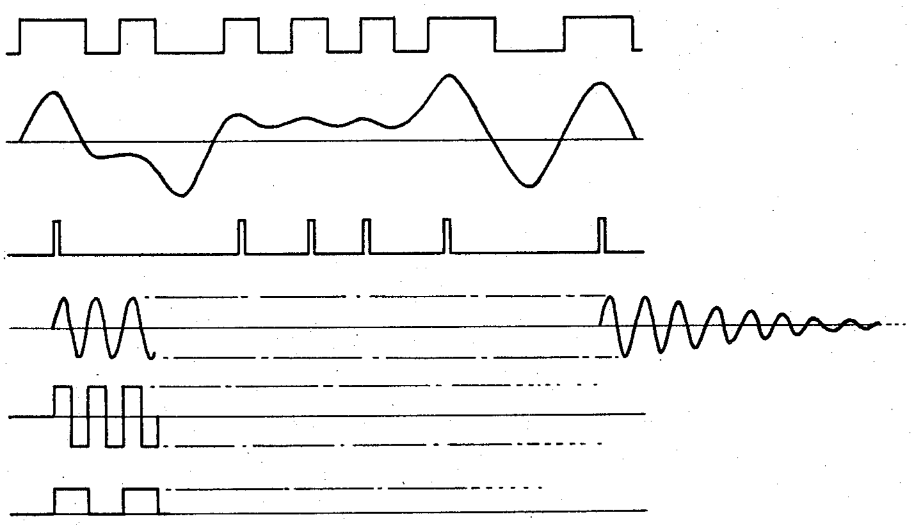
FIGURE 3 is a timing diagram showing the waveforms that exist at different portions of the system.

In operation, the record electronics 10 which comprises record logic means 12, record amplifier 14 and record transducer 18 records a zero erase code on tape 19 in accordance with the input supplied to input terminal 14. The zero erase code recorded by the record electronic means 10 is essentially a coding technique that utilizes a multiple of current or flux reversals for one bit of information preferably the "zero" of a binary code and a single flux or current reversal having a relatively long duration at a substantially constant flux level for the other bit, preferably the "one" of a binary code. The bit represented by a number of flux reversals is equivalent to or approaches an erasure of the tape and consequently when detected this bit gives rise to a small amplitude ripple or effectively a zero output signal. The single flux reversal when detected will give rise to a pulse of substantial amplitude representative of a "one" bit. A graphical simplified showing of the recorded code is shown in FIGURE 3*a*. The erasing code is discussed in greater detail in the aforementioned U.S. Patent 3,277,454.

The tape 19 is moved over the record transducer 18 by well known tape transport means 30 that may typically include a motor 32 operatively coupled to a capstan-pinch roller arrangement 34. The tape 19 is supplied to the capstan-pinch roller arrangement 34 from supply reel roller 36 and is then stored on storage reel 38. It should be understood that this is only a schematic arrangement and that the art is heavily populated with transport means that may be utilized in conjunction with the invention. Such transport means are shown in U.S. Patent 3,112,052 issued to W. R. Johnson on Nov. 26, 1963, and U.S. Patent 2,886,757 issued to L. H. Johnson on May 12, 1959.

The tape 19 also moves over reproduce transducer 22 which may be similar to record transducer 18. Reproduce transducer 22 forms part of the reproduce electronic means which also includes preamplifier means 24 and detecting means 26. Reproduce transducer 22 supplies an electrical output signal from the magnetic recording to preamplifier 24 where it is amplified and supplied to data detecting means 26. The signal supplied from preamplifier means 24 to data detecting means 26 is shown schematically in FIGURE 3*b*. This signal contains a substantial ripple representative of the zero erase portion of the code and substantial amplitude pulses representative of the "one" portion of the code. The data detecting means 26 minimizes the ripple by some sort of integrator, accentuates the substantial amplitude pulses and may also rectify these pulses so that pulses of only one polarity are supplied to output terminal 28. A typical detecting means is shown in U.S. Patent 3,064,243 issued on Nov. 13, 1962, to L. H. Thompson.

The output signal from the data detecting means 26 is transmitted from output terminal 28 to some form of computer or processing equipment. In order for the processing equipment to interpret and decode the signal supplied from detecting means 28, it is usually necessary to also supply a clock signal so that the portion of the signal represented by a substantially zero output voltage may be interpreted and the number of zeros precisely determined.

To provide the clock signal an extracting means 40 is provided comprising ripple detecting means 41, pulse standardizer 42, tuned amplifier 44, pulse shaper 46 and flip-flop 48. The ripple detecting means 41, connected to preamplifier 24, emphasizes the "zero" ripples of the signal shown in FIGURE 3*b* and detects the positive peaks of the emphasized output signal. The ripple detecting means 41 may comprise differentiating or high-pass circuit devices for emphasis and may include a rectifying means so that both the positive and negative peaks are detected. Output pulses are supplied by ripple detecting means 41 and (without rectifying means) take the form shown in FIGURE 3*c*. These output pulses are supplied to pulse standardizer means 42.

The pulse standardizer 42 forms the supplied pulses into substantially constant area pulses and supplies an output to the tuned amplifier means 44. It should be understood that in some systems the pulse standardizer may be omitted. Tuned amplifier means 44 is constructed to resonate at the second harmonic or twice the desired clock frequency. The pulses supplied by the pulse standardizer 42 contain this frequency component so that the tuned amplifier means 44 is energized at the appropriate time although it may not be energized during each of its cycles. The resonating feature of the tuned amplifier means 44 sustains it during cycles which energizing pulses are not received from the pulse standardizer 42. It should also be noted that the tuned amplifier means will generate its output frequency notwithstanding periodic or successive dropouts thereby providing a reliable output signal. The output from the tuned amplifier means 44 is shown in FIGURE 3*d*.

The output from tuned amplifier means 44 is supplied to the pulse shaper means 46 wherein the pulses are shaped to take the form shown in FIGURE 3*e*. The square waveform from the pulse shaper means 46 is supplied to a flip-flop 48 which in turn supplies an output frequency of one-half the value of that supplied by the pulse shaper means 46. The halving performed by the flip-flop means 48 results in an output clock signal that has the desired frequency. This output signal is shown in FIGURE 3*f*.

In summary, record electronic means 10 functions to record a zero erase code which is subsequently reproduced by reproduce electronic means 20. Reproduce electronic means 20 provides a data (zero erase) output signal to the terminal 28 and also provides an input to the extracting means 40 from its preamplifier means 24. The extracting means 40 extracts a clock signal from the supplied zero erase code and supplies an output clock signal to the output terminal 50. Both the data signal and the clock signal are then supplied to processing equipment wherein the transmitted information is utilized.

This invention provides an improved means for deriving a clock signal in recording systems having high packing densities. The clock signal is derived without compromising the packing densities attainable, without restraints on the data format and without concern for limited amount of dropouts or tape imperfections.

While the above-detailed description has shown, described and pointed out the fundamental novel features of the invention as applied to a preferred embodiment, it will be understood that various omissions and substitutions and changes in the form and details of the device illustrated may be made by those skilled in the art, without departing from the spirit of the invention. It is the intention, therefore, to be limited only as indicated by the scope of the following claims.

What is claimed is:

1. In a recorder system, the combination comprising:
tape transport means for moving a magnetic tape;
record electronic means for recording a zero erase code, said record electronic means coupled to the magnetic tape, said zero erase code comprising a single flux reversal defining one bit and a multiple of flux reversals defining the other bit;
reproduce electronic means for reading out said recorded zero erase code from the magnetic tape, said reproduce electronic means coupled to said magnetic tape; and
means for extracting a clock signal from said recorded zero erase code including means for generating the clock signal as a selected frequency signal in response to a single selected pulse of said zero erase code, wherein the clock signal is substantially unaffected by imperfections in the magnetic tape.

2. The structure recited in claim 1 wherein said means for extracting a clock signal includes tuned amplifier means for generating a given frequency signal for a plurality of cycles when triggered with a single pulse of the zero erase code, said tuned amplifier means coupled to said reproduce electronic means, and pulse shaper means for forming the pulses generated by said tuned amplifier means, said pulse shaper means coupled to said tuned amplifier means.

3. The structure recited in claim 2 wherein a divider means is coupled to said pulse shaper means to provide the selected frequency of said clock signal.

4. In a recorder system utilizing a magnetic media, the combination comprising:
tape transport means for moving a magnetic media;
record electronic means for recording a zero erase code, said record electronic means coupled to the magnetic media, said zero erase code comprising a single flux reversal defining one bit and a multiple of flux reversals defining the other bit;
reproduce electronic means for reading out said recorded zero erase code from the magnetic media and for supplying an output signal including ripple signals and substantial amplitude pulses indicative of the flux reversals, said reproduce electronic means coupled to said magnetic media;
means coupled to said reproduce electronics for extracting a desired clock signal from said recorded zero erase code comprising ripple detecting means for emphasizing at least positive polarity ripple signals in said output signal and for supplying pulses representative of said ripple signals and said substantial amplitude pulses, said means for extracting including tuned amplifier means for generating an output signal that has a frequency which is a multiple of a desired clock signal, said tuned amplifier means generating a plurality of cycles of said output signal for each pulse supplied thereto, said tuned amplifier means operatively coupled to said ripple detecting means.

5. The structure recited in claim 4 wherein said pulses which are representative of said ripple signals and said substantial amplitude pulses correspond to a harmonic of the said clock signal, and wherein the tuned amplifier means generates an output signal that has a frequency which is a harmonic of said clock signal.

6. The structure recited in claim 5 wherein the means for extracting further includes pulse shaper means for shaping the output of said tuned amplifier means into uniform shaped pulses, said pulse shaper means operatively coupled to said tuned amplifier means.

References Cited

IBM Technical Disclosure Bulletin, vol. 2, No. 4, pp. 64–65, December 1959.

BERNARD KONICK, *Primary Examiner.*

B. HALEY, *Assistant Examiner.*